United States Patent
Nagai et al.

(10) Patent No.: US 9,204,463 B2
(45) Date of Patent: Dec. 1, 2015

(54) TERMINAL APPARATUS TRANSMITTING SIGNAL CONTAINING PREDETERMINED INFORMATION

(71) Applicant: PANASONIC CORPORATION, Kadoma-shi, Osaka (JP)

(72) Inventors: Makoto Nagai, Gifu (JP); Yoshiharu Doi, Gifu (JP); Ken Nakaoka, Aichi (JP)

(73) Assignee: PANASONIC CORPORATION, Osaka (JP)

(*) Notice: Subject to any disclaimer, the term of this patent is extended or adjusted under 35 U.S.C. 154(b) by 225 days.

(21) Appl. No.: 13/905,810

(22) Filed: May 30, 2013

(65) Prior Publication Data

US 2013/0322368 A1    Dec. 5, 2013

(30) Foreign Application Priority Data

May 30, 2012  (JP) ................. 2012-123730
Mar. 8, 2013  (JP) ................. 2013-046456

(51) Int. Cl.
*H04W 4/00*  (2009.01)
*H04W 74/08*  (2009.01)

(52) U.S. Cl.
CPC ................. *H04W 74/0808* (2013.01)

(58) Field of Classification Search
CPC ....... G08G 1/16; G08G 1/166; G08G 5/0082; G08G 1/096791; H04W 74/0816; H04W 74/0808

USPC ................. 370/329, 312, 435, 445
See application file for complete search history.

(56) References Cited

U.S. PATENT DOCUMENTS

| | | | |
|---|---|---|---|
| 8,520,695 B1* | 8/2013 | Rubin et al. | 370/445 |
| 2009/0167513 A1* | 7/2009 | Hill et al. | 340/435 |
| 2012/0163275 A1* | 6/2012 | Kim et al. | 370/312 |

FOREIGN PATENT DOCUMENTS

JP    2005-202913 A    7/2005

* cited by examiner

*Primary Examiner* — Dang Ton
*Assistant Examiner* — Lionel Preval
(74) *Attorney, Agent, or Firm* — McDermott Will & Emery LLP

(57) ABSTRACT

An RF unit and a modem unit receive a packet signal, containing information regarding a frame construction, which is transmitted from a base station apparatus in a first period of a frame at least including first periods and second periods. An extraction unit identifies the second period in the frame, based on the received packet signal. A setting unit sets a waiting time period in the identified second period. A carrier sensing unit carries out carrier sensing over the waiting time period set by the setting unit. The modem unit and the RF unit broadcast the packet signal based on a result of the carrier sensing.

4 Claims, 17 Drawing Sheets

FIG.3A

| 1ST SUB-FRAME | 2ND SUB-FRAME | 3RD SUB-FRAME | NTH SUB-FRAME |

FIG.3B: ROAD-TO-VEHICLE TRANSMISSION PERIOD | INTER-VEHICULAR TRANSMISSION PERIOD | INTER-VEHICULAR TRANSMISSION PERIOD | INTER-VEHICULAR TRANSMISSION PERIOD

FIG.3C: INTER-VEHICULAR TRANSMISSION PERIOD | ROAD-TO-VEHICLE TRANSMISSION PERIOD | INTER-VEHICULAR TRANSMISSION PERIOD | INTER-VEHICULAR TRANSMISSION PERIOD | INTER-VEHICULAR TRANSMISSION PERIOD

FIG.3D: INTER-VEHICULAR TRANSMISSION PERIOD | INTER-VEHICULAR TRANSMISSION PERIOD | ROAD-TO-VEHICLE TRANSMISSION PERIOD | INTER-VEHICULAR TRANSMISSION PERIOD | INTER-VEHICULAR TRANSMISSION PERIOD

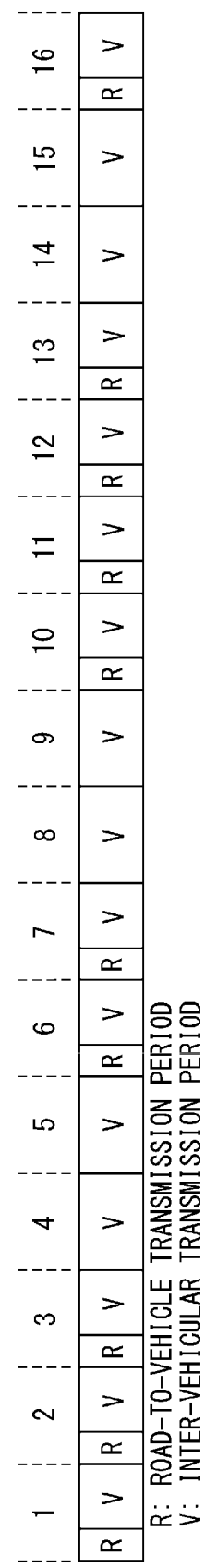

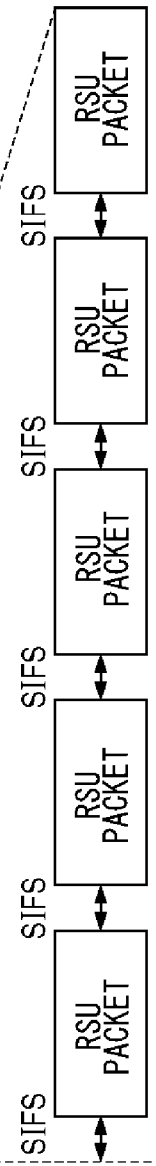
FIG.5A
FIG.5B

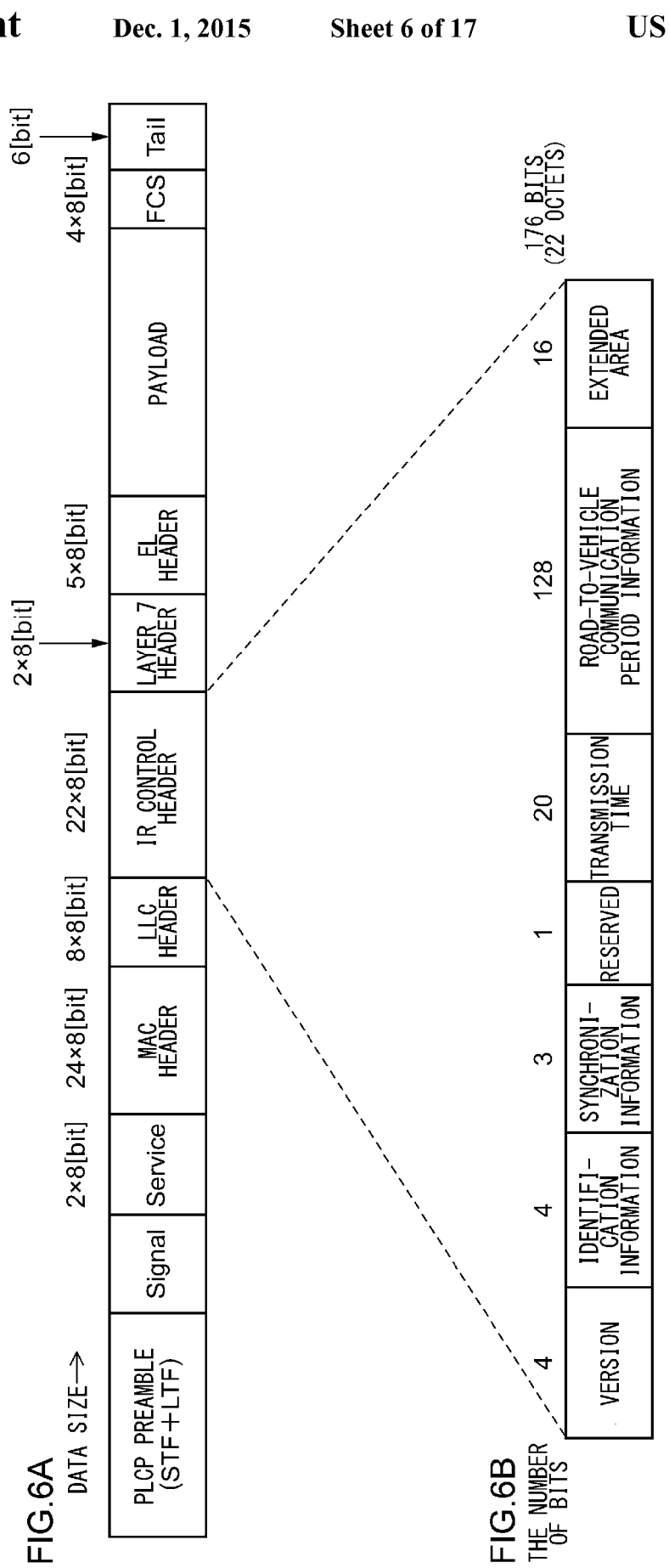

FIG.11A
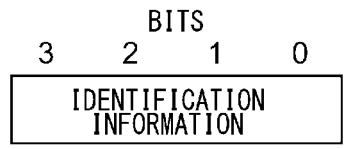
FIG.11B
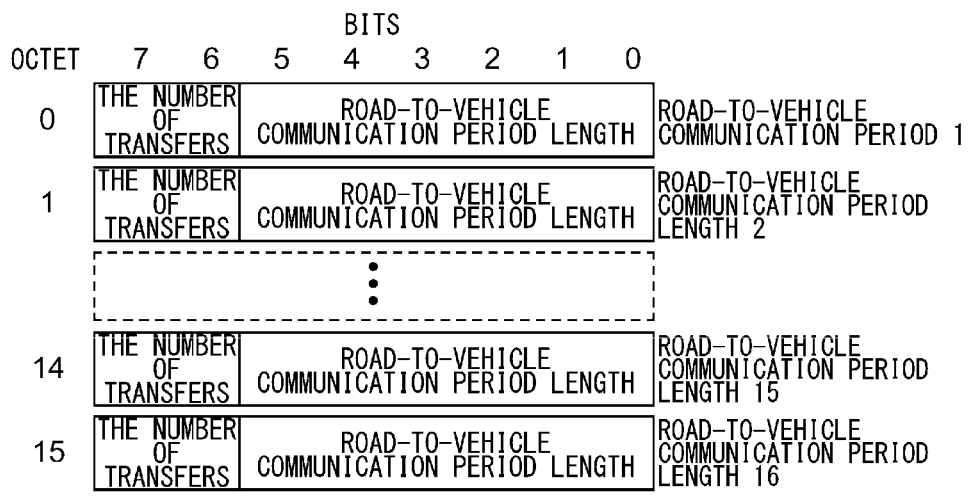
FIG.11C
| b7 | b6 | MEANING |
|---|---|---|
| 0 | 0 | NO TRANSFER |
| 0 | 1 | THE NUMBER OF TRANSFERS :1 |
| 1 | 0 | THE NUMBER OF TRANSFERS :2 |
| 1 | 1 | THE NUMBER OF TRANSFERS :3 |
FIG.11D
| b5~b0 | | | | MEANING |
|---|---|---|---|---|
| 0 | 0 | 0 | 0 | THERE IS NO ROAD-TO-VEHICLE COMMUNICATION PERIOD |
| 0 | 0 | 0 | 1 | ROAD-TO-VEHICLE COMMUNICATION PERIOD LENGTH: 48us (3 UNITS) |
| 0 | 0 | 1 | 0 | ROAD-TO-VEHICLE COMMUNICATION PERIOD LENGTH: 96us (6 UNITS) |
| ..... | | | | ...... |
| 1 | 1 | 1 | 1 | ROAD-TO-VEHICLE COMMUNICATION PERIOD LENGTH: 3024us (189 UNITS) |

FIG.12

|  | BITS | | | | | | | |
|---|---|---|---|---|---|---|---|---|
|  | 7 | 6 | 5 | 4 | 3 | 2 | 1 | 0 |
| OCTET 0 | R1 | R2 | R3 | R4 | R5 | R6 | R7 | R8 |
| OCTET 1 | R9 | R10 | R11 | R12 | R13 | R14 | R15 | R16 |

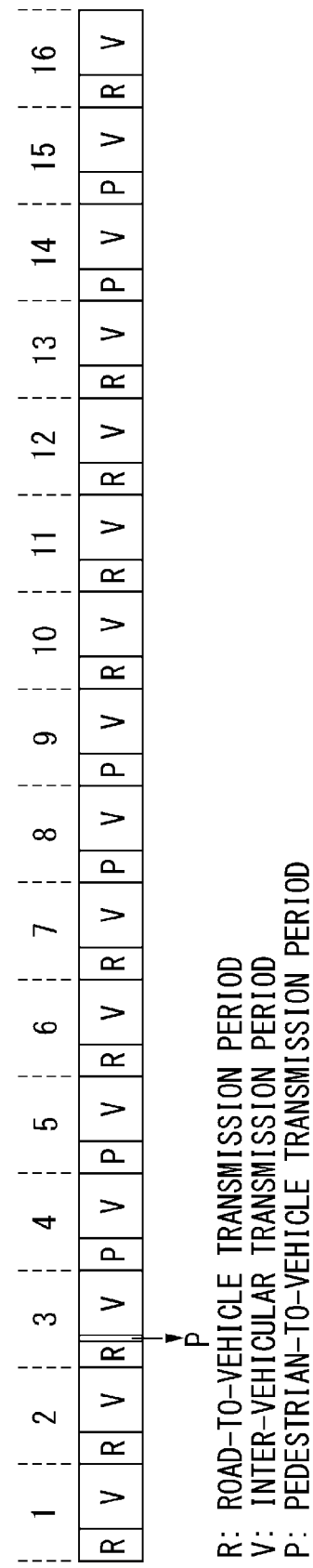

| b5~b0 | MEANING |
|---|---|
| 0 0 0 0 0 0 | THERE IS NO ROAD-TO-VEHICLE COMMUNICATION PERIOD |
| 0 0 0 0 0 1 | ROAD-TO-VEHICLE COMMUNICATION PERIOD LENGTH: 48us (3 UNITS) |
| 0 0 0 0 1 0 | ROAD-TO-VEHICLE COMMUNICATION PERIOD LENGTH: 96us (6 UNITS) |
| ..... | ...... |
| 1 1 1 1 1 1 | ROAD-TO-VEHICLE COMMUNICATION PERIOD LENGTH: 3024us (189 UNITS) |

US 9,204,463 B2

TERMINAL APPARATUS TRANSMITTING SIGNAL CONTAINING PREDETERMINED INFORMATION

BACKGROUND OF THE INVENTION

1. Field of the Invention

The present invention relates to a communication technology, and it particularly relates to a terminal apparatus for transmitting signal containing predetermined information.

2. Description of the Related Art

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit.

In a vehicle-to-vehicle (inter-vehicular) communication, information is communicated between in-vehicle units Where, in addition to the roadside unit and the in-vehicle units, the information is transmitted also from terminal apparatuses carried by pedestrians, it is desirable that the transmission opportunities are ensured for all of these apparatuses.

SUMMARY OF THE INVENTION

The present invention has been made in view of the foregoing circumstances, and a purpose thereof is to provide a technology for ensuring the transmission opportunities for radio apparatuses of a plurality of different types when the signals are transmitted from the different types of radio apparatuses.

In order to resolve the above-described problems, a terminal apparatus according to one embodiment of the present invention includes: a receiver configured to receive a packet signal, containing information regarding a frame construction, which is transmitted from a base station apparatus in a first period of a frame at least including a first period and a second period; an identifying unit configured to identify the second period in the frame, based on the packet signal received by the receiver; a setting unit configured to set a waiting time period in the second period identified by the identifying unit; a carrier sensing unit configured to perform carrier sensing over the waiting time period set by the setting unit; and a transmitter configured to transmit a packet signal based on a result of the carrier sensing performed by the carrier sensing unit. A range of the waiting time period settable by the setting unit is longer than a range of the waiting time period, for the carrier sensing, which is settable by another terminal apparatus of a different type capable of transmitting a packet signal in the second period.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3D each shows a format of frame specified in the communication system of FIG. 1;

FIG. 4 shows another example of format different from the formats shown in FIGS. 3A to 3D;

FIGS. 5A and 5B each shows a structure of subframe in FIGS. 3A to 3D and FIG. 4.

FIGS. 6A and 6B show a format of packet signal specified in the communication system of FIG. 1;

FIGS. 11A to 11D each shows a format of packet signal according to another modification of en exemplary embodiment;

FIG. 12 shows a format of packet signal according to another modification of an exemplary embodiment;

FIG. 13 shows a format of frame according to still another modification of an exemplary embodiment;

DETAILED DESCRIPTION OF THE INVENTION

Figure 1:
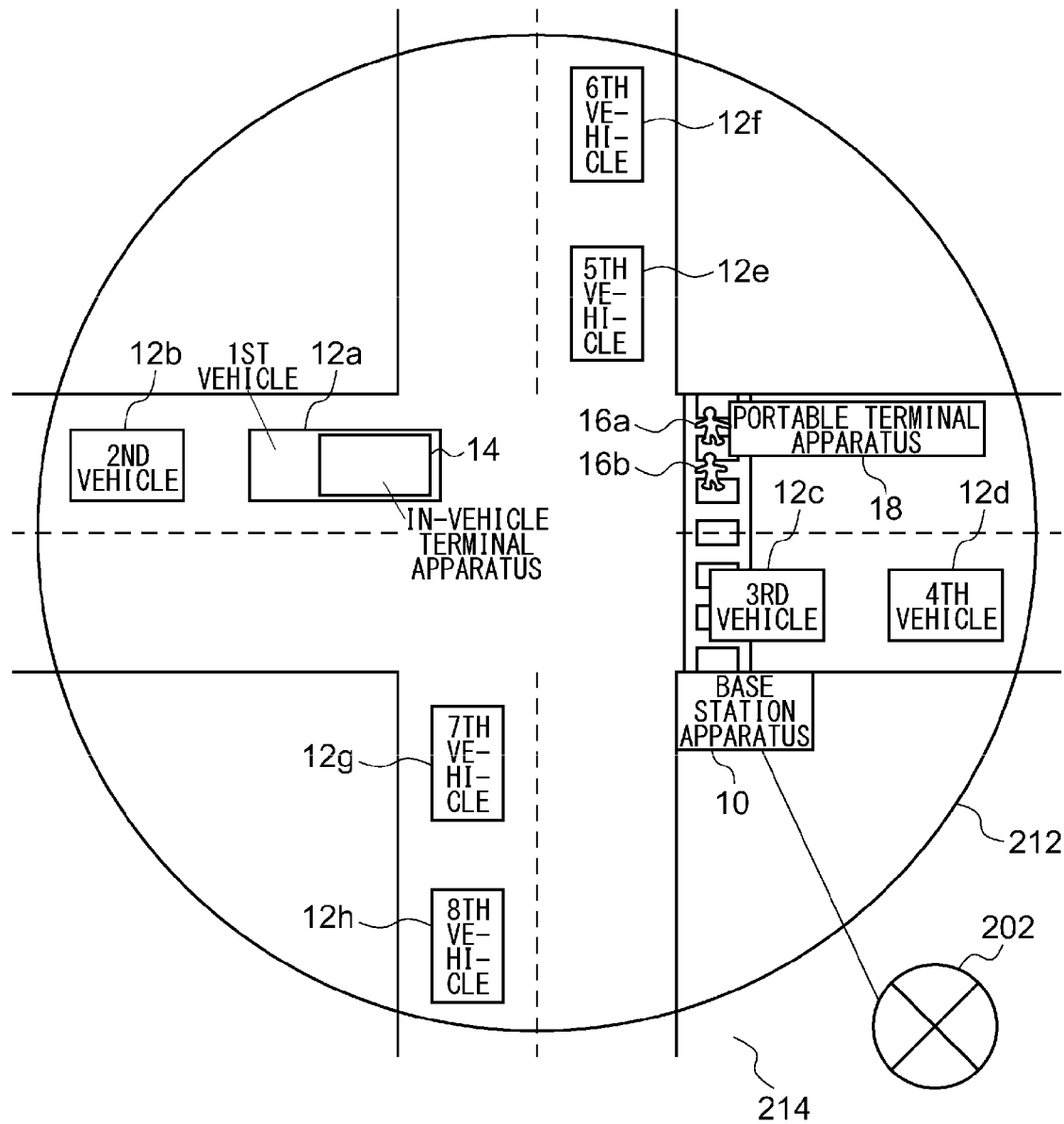
FIG. 1 shows a structure of a communication system according to an exemplary embodiment of the present invention.

The invention will now be described by reference to the preferred embodiments. This does not intend to limit the scope of the present invention, but to exemplify the invention.

Our knowledge underlying the present invention will be explained before exemplary embodiments of the present invention are explained in detail. Exemplary embodiments of the present invention relate to a communication system that carries out not only an inter-vehicular communication between terminal apparatuses mounted on vehicles but also a road-to-vehicle communication from a base station apparatus installed in an intersection and the like to the terminal apparatuses. Such a communication system is called an intelligent transport system (ITS) also. Similar to wireless LANs (Local Area Network) compliant with standards such as IEEE 802.11, the communication system uses an access control function called Carrier Sense Multiple Access with Collision Avoidance (CSMA/CA). Thus, the same wireless channel is shared by a plurality of terminal apparatuses. On the other hand, in the ITS, a need arises to transmit information to a large indefinite number of terminal apparatuses. In order to efficiently transmit the information thereto, the communication system according to the present exemplary embodiments transmits packet signals by broadcast.

As the inter-vehicular communication, a terminal apparatus transmits, by broadcast, a packet signal in which the information such as the traveling speed and position of a vehicle is stored. Also, other terminal apparatuses receive the packet signals and recognize the approach or the like of the vehicle based on said information. Conveying the approach of the vehicle to a driver alerts the driver. In order to reduce the interference between the inter-vehicular communication and the road-to-vehicle communication, the base station apparatus repeatedly specifies a frame that contains a plurality of subframes. To perform the road-to-vehicle communication, the base station apparatus selects any of a plurality of subframes and transmits, by broadcast, a packet signal that contains control information and the like, in a period of a beginning part of the selected subframe.

The control information contains information regarding a time length required for the transmission of the packet signal by broadcast from the base station apparatus (hereinafter this time length will be referred to as "road-to-vehicle transmission period"). The terminal apparatus identifies the road-to-vehicle period based on the control information, and transmits, by broadcast, packet signals in a period other than the road-to-vehicle transmission period (hereinafter this period will be referred to as "inter-vehicular transmission period") using a CSMA scheme. As a result, the road-to-vehicle communication and the inter-vehicular communication are subjected to time-division multiplexing. Note that terminal apparatuses, which are located outside an area formed around the base station apparatus, transmit the packet signals, using the CSMA scheme, regardless of the frame construction.

It is desired that not only the collision accidents of vehicles but also the collision accidents between pedestrians and so forth and vehicles be prevented. In order to achieve this, the terminal apparatuses are not only mounted on the vehicles but also carried by the pedestrians. To prevent a pedestrian from being hit by a vehicle, the terminal apparatus carried by the pedestrian conveys the present location of the pedestrian to an in-vehicle terminal apparatus. Since the terminal apparatus carried by the pedestrian is battery-driven, the processing amount in the battery-driven terminal apparatus carried by the pedestrian needs to be reduced as compared with the processing amount in the in-vehicle terminal apparatus. For example, the approach of the other vehicles is not conveyed to the pedestrian. In an environment where the in-vehicle terminal apparatuses and the pedestrian's terminal apparatuses are present mixedly, the transmission opportunities are preferably ensured for every apparatus.

An outline of the present exemplary embodiments is first given. Hereinafter, a terminal apparatus for in-vehicle use will be referred to as "in-vehicle terminal apparatus", whereas a terminal apparatus carried by a pedestrian will be referred to as "portable terminal apparatus". Also, there may be cases where both an in-vehicle terminal apparatus and a portable terminal apparatus are simply referred to as "terminal apparatus" without making distinction therebetween. There may be cases where an in-vehicle terminal apparatus and a portable terminal apparatus are generically referred to as "terminal apparatuses". For example, each mobile apparatus is driven by a battery. For the purpose of reducing the power consumed by a portable terminal apparatus, it is assumed herein that the portable terminal apparatus only transmits, by broadcast, packet signals and does not notify the pedestrian of the approach of a vehicle. Note also that, in the following description, even when the portable terminal apparatus is used, the communication performed then may be expressed as "inter-vehicular communication" or "road-to-vehicle communication".

Similar to the in-vehicle terminal apparatus, the portable terminal apparatus will also execute the CSMA scheme in an inter-vehicular transmission period. In the CSMA scheme, the maximum value of random waiting time period varies, and carrier sensing is done during an extended period where a selected random waiting time period and a fixed waiting time period are added up. Here, it is preferable that even if a portable terminal apparatus is to be added, an adverse effect of such an added portable terminal apparatus on the communications between in-vehicle terminal apparatuses be suppressed. In order to do so, the maximum value of random waiting time period at an in-vehicle terminal apparatus is defined and specified such that the maximum value thereof is shorter than the maximum value of random waiting time period at the portable terminal apparatus. Note that the amount of information transmitted by broadcast from the portable terminal apparatus is made to be smaller than that transmitted by broadcast from the in-vehicle terminal apparatus. As a result, the packet signal length at the former is smaller than that at the latter. In the following description, "transmission by broadcast" or "broadcasting" will be sometimes referred to simply as "transmission".

FIG. 1 shows a structure of a communication system 100 according to an exemplary embodiment of the present invention. FIG. 1 corresponds to a case where an intersection is viewed from above. The communication system 100 includes a base station apparatus 10 and a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12", a first pedestrian 16a and a second pedestrian 16b, who are generically referred to as "pedestrian 16" or "pedestrians 16", and a network 202. Though shown in the first vehicle 12a only, an in-vehicle terminal apparatus 14 is mounted on every vehicle 12. Though shown in the first pedestrian 16a only, each pedestrian 16 carries a portable terminal apparatus 18. Further, an area 212 is formed around the base station apparatus 10, and an almost-unreachable area 214 is formed outside the area 212.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the "intersection". The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

In the communication system 100, the base station apparatus 10 is secured to and installed at the intersection. The base station apparatus 10 controls communications between the terminal apparatuses. The base station apparatus 10 repeatedly generates a frame containing a plurality of subframes, based on either the signal received from not-shown GPS (Global Positioning System) satellites or frames formed by the other base station apparatuses 10 (not-shown). Here, a definition is made such that a road-to-vehicle transmission period can be set to the leading part (beginning part) of each subframe.

The base station apparatus 10 selects a subframe, in which the road-to-vehicle transmission period is not set by the other base station apparatuses 10, from among a plurality of subframes of a frame. The base station apparatus 10 sets the road-to-vehicle transmission period to the beginning part of the selected subframe. The base station apparatus 10 broadcasts the packet signal in the thus set road-to-vehicle transmission period. In the road-to-vehicle transmission period, there may be cases where a plurality of packet signals are broadcast. The packet signal contains traffic accident information, traffic congestion information, signal information and so forth, for instance. The packet signal also contains the information concerning the timing with which the road-to-vehicle transmission period has been set and the control information concerning frames.

As described earlier, an in-vehicle terminal apparatus 14 is mounted on a vehicle 12 and is movable from one location to another. As the in-vehicle terminal apparatus 14 receives a packet signal from the base station apparatus 10, the in-vehicle terminal apparatus 14 estimates that the vehicle 12 is located in the area 212. If the vehicle 12 carrying an in-vehicle terminal apparatus 14 is located in the area 212, said in-vehicle terminal apparatus 14 produces a frame based on the control information, contained in the packet signal, which is particularly the information concerning the timing, with which the road-to-vehicle transmission period has been set, and the information concerning frames. As a result, frames generated respectively by a plurality of in-vehicle terminal apparatuses 14 are synchronized with a frame generated by the base station apparatus 10. The in-vehicle terminal apparatus 14 broadcasts the packet signal in the inter-vehicular transmission period, which is a period different from the road-to-vehicle transmission period. In so doing, CSMA/CA is carried out in this inter-vehicular transmission period. If, on the other hand, it is estimated that the vehicle 12 carrying the in-vehicle terminal apparatus 14 is located in the almost-unreachable area 214, the in-vehicle terminal apparatus 14 will carry out CSMA/CA regardless of the frame construction and thereby broadcast the packet signals. Further, the in-vehicle terminal apparatus 14 receives a packet signal from another in-vehicle terminal apparatus 14, thereby notifying the driver that a vehicle where the other in-vehicle terminal apparatus is installed is approaching.

Each pedestrian 16 carries a portable terminal apparatus 18. The portable terminal apparatus 18 carries out the processing similar to that carried out by the in-vehicle terminal apparatus 14. Note, however, that the portable terminal apparatus 18 will not notify the pedestrian 16 of the approach and the like of a vehicle in order to simplify the processing. The portable terminal apparatus 18 sets the random waiting time period such that an average waiting time period while CSMA/CA is being carried out is longer than an average waiting time period at the in-vehicle terminal apparatus 14. Further, the transmission power at a portable terminal apparatus 18 may be set such that it is smaller than the transmission power at the other apparatuses.

Figure 2:
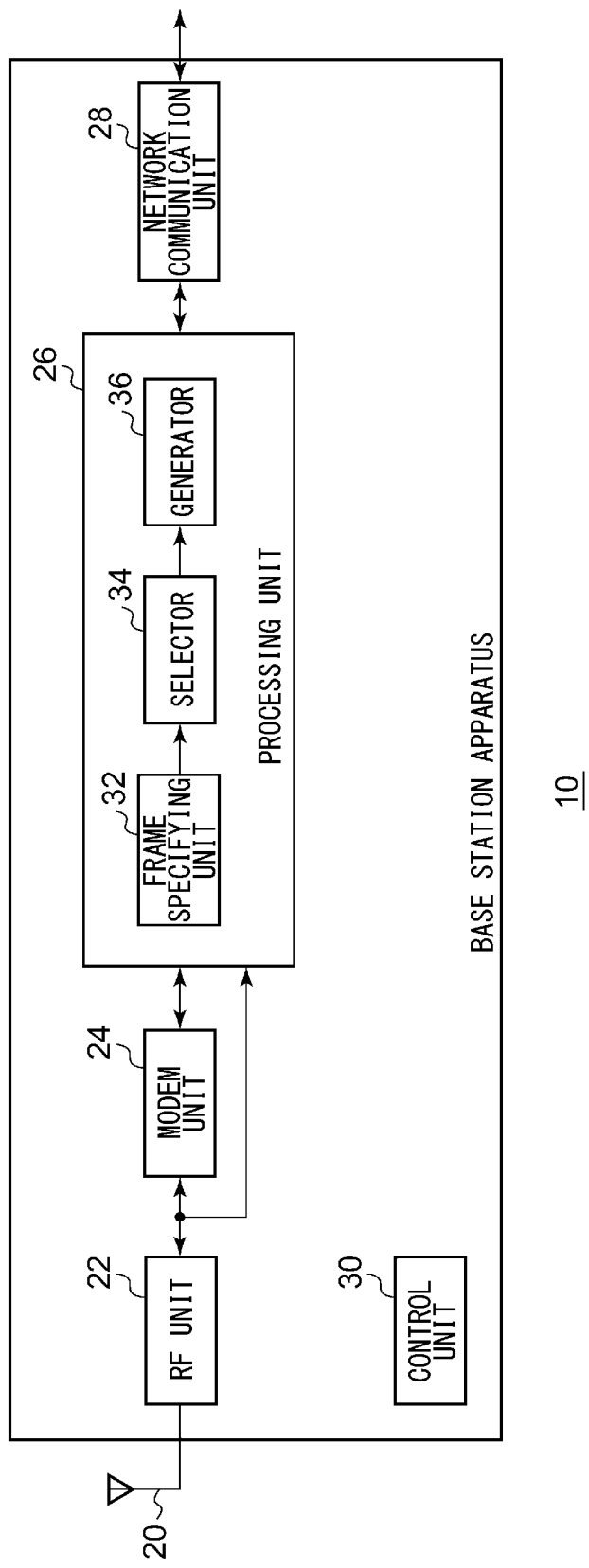
FIG. 2 shows a base station apparatus of FIG. 1.

FIG. 2 shows the base station apparatus 10. The base station apparatus 10 includes an antenna 20, an RF unit 22, a modem unit 24, a processing unit 26, a network communication unit 28, and a control unit 30. The processing unit 26 includes a frame specifying unit 32, a selector 34, and a generator 36.

As a receiving processing, the RF unit 22 receives, through the antenna 20, packet signals transmitted from not-shown terminal apparatuses and the other base station apparatuses (not shown). The RF unit 22 performs a frequency conversion on the received packet signal of a radiofrequency and thereby generates a packet signal of baseband. Further, the RF unit 22 outputs the baseband packet signal to the modem unit 24. Generally, a baseband packet signal is formed of an in-phase component and a quadrature component, and therefore the baseband packet signal is to be represented by two signal lines. However, the baseband packet signal is represented by a single signal line here to make the illustration clearer for understanding. The RF unit 22 also includes an LNA (Low Noise Amplifier), a mixer, an AGC (Automatic Gain control) unit, and an A/D (Analog-to-Digital) converter.

As a transmission processing, the RF unit 22 performs a frequency conversion on the baseband packet signal inputted from the modem unit 24 and thereby generates a radiofrequency packet signal. Further, the RF unit 22 transmits, through the antenna 20, the radiofrequency packet signal in a road-to-vehicle transmission period. The RF unit 22 also includes a PA (Power Amplifier), a mixer, and a D-A (Digital-to-Analog) converter.

As a receiving processing, the modem unit 24 demodulates the baseband packet signal fed from the RF unit 22. Further, the modem unit 24 outputs the demodulation result to the processing unit 26. As a transmission processing, the modem unit 24 modulates the data fed from the processing unit 26. Further, the modem unit 24 outputs the modulation result to the RF unit 22 as a baseband packet signal. It is to be noted here that the communication system 100 is compatible with an OFDM (Orthogonal Frequency Division Multiplexing) modulation scheme and therefore the modem unit 24 performs FFT (Fast Fourier Transform) as a receiving processing and performs IFFT (Inverse Fast Fourier Transform) as a transmission processing as well.

The frame specifying unit 32 receives signals from the not-shown GPS satellites and acquires information on the time of day based on the received signals. Note that known art can be used for the acquisition of information on the time of day and therefore the description thereof is omitted here. The frame specifying unit 32 generates a plurality of frames based on the information on the time of day. For example, the frame specifying unit 32 generates ten "100 msec" frames by dividing a duration of "1 sec" into 10 parts with reference to the timing indicated by the information on the time of day. Frames are thus defined and specified repeatedly through the repetition of this process. Note that the frame specifying unit 32 may detect the control information from the demodulation result and generate frames based on the detected control information. Such a processing as this corresponds to a process of generating a frame synchronized with the timing of the frames formed by the other base station apparatuses 10.

FIGS. 3A to 3D each shows a format of frame specified in the communication system 100. FIG. 3A shows a structure of a frame. Each frame is constructed of N subframes denoted by a first subframe to an N-th subframe. For example, when each frame is 100 msec long and N is 8, the subframe of 12.5 msec in length (duration) is defined. Note that N is not limited to 8 and may be other than 8. A description of FIGS. 3B to 3D will be given later. Now, refer back to FIG. 2.

The selector 34 selects a subframe, with which to set the road-to-vehicle transmission period, from among a plurality of subframes contained in a frame. More to the point, the selector 34 receives a frame defined by the frame specifying unit 32. Also, the selector 34 receives an instruction regarding the selected subframe via a not-shown interface. The selector 34 selects a subframe according to the instruction. Aside from this, the selector 34 may automatically select a subframe. At this time, the selector 34 receives the input of demodulation results from the not-shown other base station apparatuses 10 or in-vehicle terminal apparatuses 14. The selector 34 extracts the demodulation result sent from the other base station apparatuses 10 from among the demodulation results inputted. The selector 34 identifies a subframe, which does not receive the demodulation result, by identifying the subframe that has received the demodulation result.

This corresponds to identifying an unused subframe, namely, a subframe to which the road-to-vehicle transmission period is not set by the other base station apparatuses 10. If there are a plurality of unused subframes, the selector 34 will randomly select a single subframe. If there is no unused subframes, namely, if a plurality of subframes are all used respectively, the selector 34 will acquire the received power corresponding to the demodulation result and select preferentially a subframe whose received power is smaller.

FIG. 3B shows a structure of a frame generated by a first base station apparatus 10a. The first base station apparatus 10a sets a road-to-vehicle transmission period at the beginning of the first subframe. Subsequent to this road-to-vehicle transmission period, the first base station apparatus 10a sets an inter-vehicular transmission period in the first subframe. The inter-vehicular transmission period is a period during which a terminal apparatus can broadcast a packet signal. In other words, the subframes are defined such that the first base station apparatus 10a can broadcast the packet signal in the road-to-vehicle transmission period assigned to the beginning of the first subframe and such that an in-vehicle terminal apparatus 14 can broadcast the packet signal in the inter-vehicular transmission period, which is a period other than the road-to-vehicle transmission period, in each frame. Further, the first base station apparatus 10a sets the inter-vehicular transmission periods only to the second to N-th subframes.

FIG. 3C shows a structure of a frame generated by a second base station apparatus 10b. The second base station apparatus 10b sets a road-to-vehicle transmission period at the beginning of the second subframe. Also, the second base station apparatus 10b sets an inter-vehicular transmission period to the subsequent remaining period of the second subframe, and sets the inter-vehicular transmission periods to the first subframe, the third to N-th subframes. FIG. 3D shows a structure of a frame generated by a third base station apparatus 10c. The third base station apparatus 10c sets a road-to-vehicle transmission period at the beginning of the third subframe. Also, the third base station apparatus 10c sets an inter-vehicular transmission period to the subsequent remaining period of the third subframe, and sets the inter-vehicular transmission periods to the first and second subframes and the fourth to N-th subframes. In this manner, a plurality of base station apparatuses 10 select mutually different subframes from each other and then set the road-to-vehicle transmission periods at their beginnings of the mutually different subframes selected, respectively.

FIG. 4 shows another example of format different from the formats shown in FIGS. 3A to 3D. In this example of FIG. 4, the number N of subframes is "16". The format of a frame shown in FIG. 4 is similar to the formats of FIGS. 3A to 3D, and the patterns of road-to-vehicle transmission periods assigned to subframes shown in FIG. 4 differ from those of FIGS. 3A to 3D. Refer back to FIG. 2. The selector 34 outputs the selected subframe numbers to the generator 36.

The generator 36 receives the subframe numbers from the selector 34. The generator 36 sets the road-to-vehicle transmission periods to the subframes that correspond to the received subframe numbers, and generates packet signals to be broadcast in the road-to-vehicle transmission periods. If a plurality of packet signals are to be transmitted in one road-to-vehicle transmission period, the generator 36 will generate those packet signals. FIGS. 5A and 5B show a structure of subframe. FIG. 5A shows a subframe where a road-to-vehicle transmission period is set. As shown in FIGS. 5A and 5B, a given subframe is constructed of a road-to-vehicle transmission period and an inter-vehicular transmission period in this order. FIG. 5B shows an arrangement of packet signal in the road-to-vehicle transmission period. As shown in FIG. 5B, a plurality of RSU (Roadside Unit) packet signals are arranged in the road-to-vehicle transmission period. The RSU packet signals are packets signals transmitted from the base station apparatuses. It is to be noted here that the previous and next packet signals are separated by a short interframe space (SIFS).

A description is given here of a structure of RSU packet signal. FIGS. 6A and 6B show a format of packet signal specified in the communication system 100. The packet signal shown in FIG. 6A is constructed such that "PLCP (Physical-Layer Convergence Protocol) preamble", "Signal", "Service", "MAC (Medium Access Control) header", "LLC (Logical Link Control) header", "IR (Infrared) control header", "Layer 7 header", "EL header", "payload", "FCS (Frequency Check Sequence)", and "Tail" are assigned in this order starting from the beginning of the packet signal. The IR header is constructed such that "version", "identification information", "synchronization information", "reserved", "transmission time", "road-to-vehicle communication period information", and "extended area" are assigned in this order starting from the beginning of the IR header.

The network communication unit 28 connects to the not-shown network 202. The network communication unit 28 receives the traffic congestion information from the network 202. The generator 36 acquires the traffic congestion information from the network communication unit 28, stores the acquired congestion information in a data payload and thereby generates the aforementioned RSU packet signal. The control unit 30 controls the entire processing of the base station apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 7:
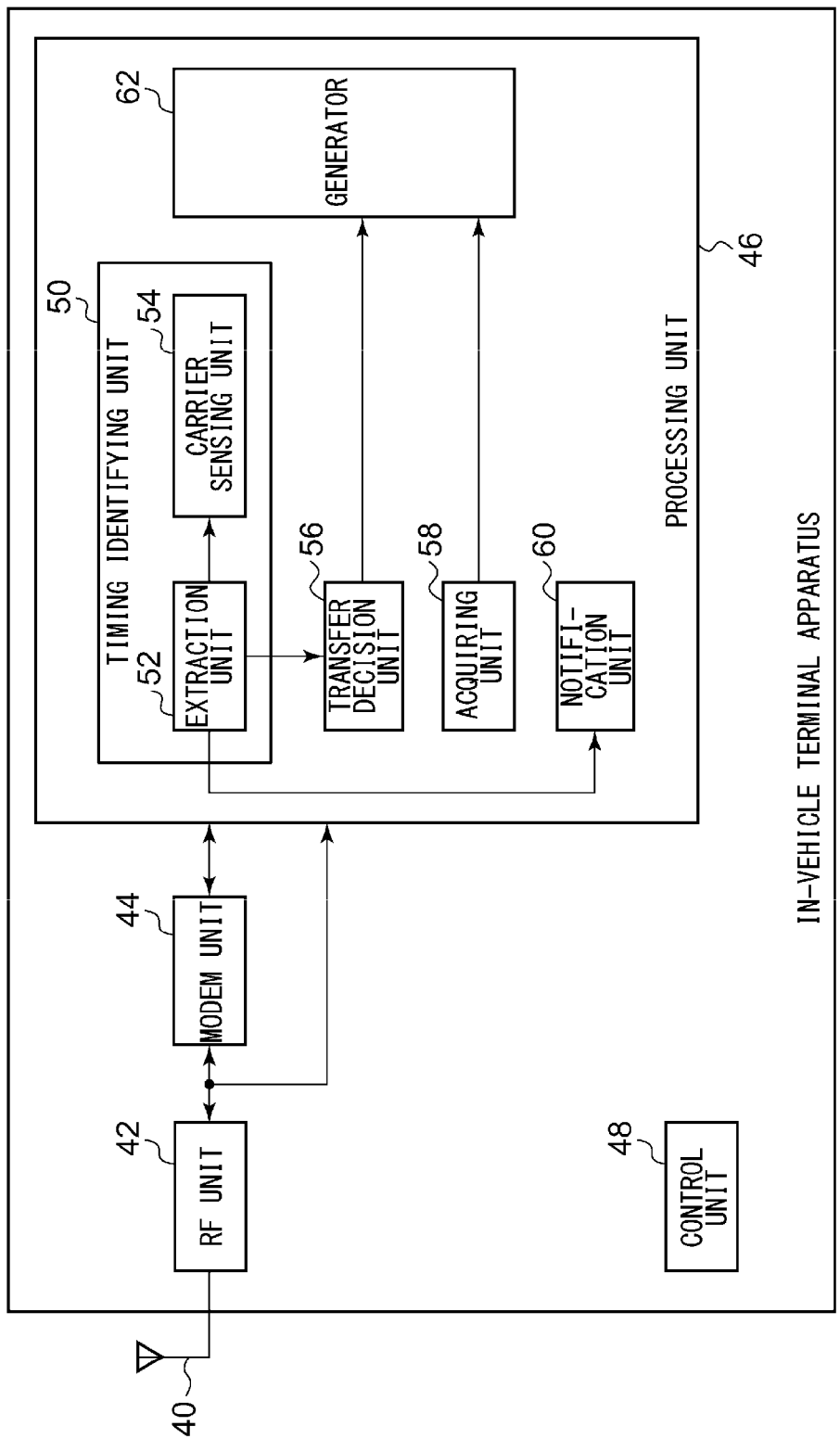
FIG. 7 shows a structure of an in-vehicle terminal apparatus mounted on a vehicle shown in FIG. 1.

FIG. 7 shows a structure of an in-vehicle terminal apparatus 14 mounted on a vehicle 12. The in-vehicle terminal apparatus 14 includes an antenna 40, an RF unit 42, a modem unit 44, a processing unit 46, and a control unit 48. The processing unit 46 includes a timing identifying unit 50, a transfer decision unit 56, an acquiring unit 58, a notification unit 60, and a generator 62. The timing identifying unit 50 includes an extraction unit 52 and a carrier sensing unit 54. The antenna 40, the RF unit 42, and the modem unit 44 perform the processings similar to those of the antenna 20, the RF unit 22, and the modem unit 24 of FIG. 2, respectively. A description is therefore given here centering around features different from those of FIG. 2.

The modem unit 44 and the processing unit 46 receive the packet signals sent from the not-shown other in-vehicle terminal apparatuses 14 and the base station apparatus 10. The modem unit 44 and the processing unit 46 receive the packet signal, sent from the base station apparatus 10, in the road-to-vehicle transmission period. The modem unit 44 and the processing unit 46 receive the packet signals, sent from the other in-vehicle terminal apparatus 14 and the portable terminal apparatus 18, in the inter-vehicular transmission period.

When the demodulation result fed from the modem unit 44 relates to the packet signal sent from the not-shown base station apparatus 10, the extraction unit 52 identifies the timing of a subframe to which the road-to-vehicle transmission period has been assigned. In this case, it is estimated that the extraction unit 52 of the in-vehicle terminal apparatus 14 is located within the area 212. The extraction unit 52 generates frames based on the timing of the subframe and the content of message header in the packet signal. As a result, the extraction unit 52 generates a frame synchronized with the frame formed by the base station apparatus 10. If the senders of the packet signals are the other in-vehicle terminal apparatuses 14 and the portable terminal apparatus 18, the extraction unit 52 will skip the process of generating the frames synchronized therewith. If it is located within the area 212, the extraction unit 52 will identify the road-to-vehicle transmission period in use and then identify the remaining inter-vehicular transmission period. The extraction unit 52 outputs the timings of frames and subframes and the information concerning the inter-vehicular transmission period to the carrier sensing unit 54.

If, on the other hand, the packet signal sent from the base station apparatus 10 is not being received, namely if the frame synchronized with the frame formed by the base station apparatus 10 is not being generated, it will be estimated that the extraction unit 52 of the in-vehicle terminal apparatus 14 is located in the almost-unreachable area 214. If it is located in the almost-unreachable area 214, the extraction unit 52 will select a timing independent of the frame construction and instruct the carrier sensing unit 54 to carry out carrier sensing independent of the frame construction.

The carrier sensing unit 54 receives from the extraction unit 52 the timings of frames and subframes and the information concerning the inter-vehicular transmission period. The carrier sensing unit 54 starts CSMA/CA within the inter-vehicular transmission period and thereby determines the transmission timing. This corresponds to setting NAV (Network Allocation Vector) for the road-to-vehicle transmission period and carrying out carrier sensing in a period during which no NAV is set. If, on the other hand, the extraction unit 52 instructs the carrier sensing unit 54 to carry out carrier sensing independent of the frame construction, the carrier sensing unit 54 will carry out CSMA/CA without regard to the frame construction so as to determine the transmission timing. The carrier sensing unit 54 conveys the thus determined transmission timing to the modem unit 44 and the RF unit 42 and transmits the packet signal by broadcast.

The acquiring unit 58 includes a GPS receiver, a gyro sensor, a vehicle speed sensor, and so forth all of which are not shown. The acquiring unit 58 acquires the present position, traveling direction, traveling speed and so forth of an in-vehicle terminal apparatus 14, based on data supplied from the aforementioned not-shown components of the acquiring unit 58. (Hereinafter the present position, traveling direction, traveling speed and so forth thereof will be generically referred to as "positional information" or "position information".) The present position thereof is indicated by the latitude and longitude. Known art may be employed to acquire them and therefore the description thereof is omitted here. The acquiring unit 58 outputs the positional information to the generator 62.

The transfer decision unit 56 controls the transfer of the control information. The control information corresponds to the IR control header, for instance. The transfer decision unit 56 extracts information to be transferred, out of the control information. The transfer decision unit 56 generates information to be transferred, based on the extracted information. A description of such a processing as this is omitted here. The transfer decision unit 56 outputs the information to be transferred, namely a part of the control information, to the generator 62.

The generator 62 receives the positional information from the acquiring unit 58 and receives the part of the control information from the transfer decision unit 56. The generator 62 uses the format shown in FIGS. 6A and 6B and stores the positional information in the payload. The generator 62 generates a packet signal and transmits, by the broadcast, the thus generated packet signal via the modem unit 44, the RF unit 42 and the antenna 40 with the transmission timing determined by the carrier sensing unit 54.

The notification unit 60 acquires the packet signal sent from the not-shown base station apparatus 10 via the extraction unit 52 and also acquires the packet signals sent from the not-shown other in-vehicle terminal apparatuses 14 and the portable terminal apparatus 18. As a process carried out for the acquired packet signal, the notification unit 60 conveys the approach or the like of the not-shown other vehicles 12 and pedestrians 16 to the driver via a monitor or speaker according to the content of data stored in the packet signal. Further, the notification unit 60 conveys the traffic congestion information and so forth to the driver via the monitor and the speaker.

Figure 8:
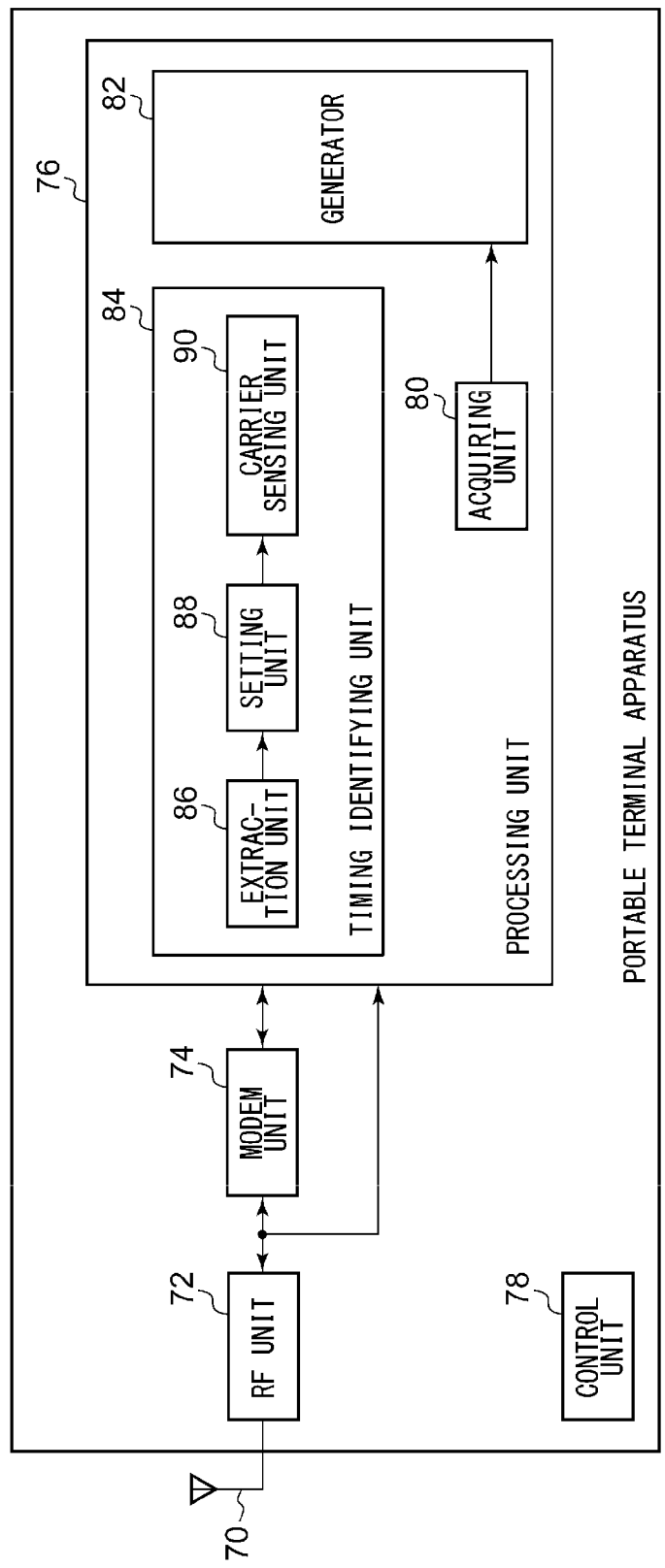
FIG. 8 shows a structure of a portable terminal apparatus carried by a pedestrian of FIG. 1.

FIG. 8 shows a structure of a portable terminal apparatus 18 carried by a pedestrian 16. The portable terminal apparatus 18 includes an antenna 70, an RF unit 72, a modem unit 74, a processing unit 76, and a control unit 78. The processing unit 76 includes an acquiring unit 80, a generator 82, and a timing identifying unit 84. The timing identifying unit 84 includes an extraction unit 86, a setting unit 88, and a carrier sensing unit 90. Similar to the acquiring unit 58 shown in FIG. 7, the acquiring unit 80 acquires the positional information. The acquiring unit 80 outputs the positional information to the generator 82.

Similar to the modem unit 44 and the processing unit 46 of FIG. 7, the modem unit 74 and the processing unit 76 receive the packet signals sent from the not-shown other terminal apparatuses and the base station apparatus 10. In particular, the modem unit 74 and the processing unit 76 receive a packet signal, containing information regarding the frame construction, which is transmitted from the base station apparatus 10 in the road-to-vehicle transmission period of a frame at least including the road-to-vehicle transmission period and the inter-vehicular transmission period. Similar to the extraction unit 52, the extraction unit 86 identifies the timing of a subframe to which the road-to-vehicle transmission period has been assigned, when the demodulation result fed from the modem unit 74 relates to the packet signal sent from the not-shown base station apparatus 10. Also, the extraction unit 86 identifies the inter-vehicular transmission period and outputs the timing of the frame and subframes and the information regarding the inter-vehicular transmission period to the setting unit 88. If, on the other hand, the extraction unit 86 selects the timing independent of the frame construction, the extraction unit 86 will inform the setting unit 88 that the frame is not specified.

Figure 9:
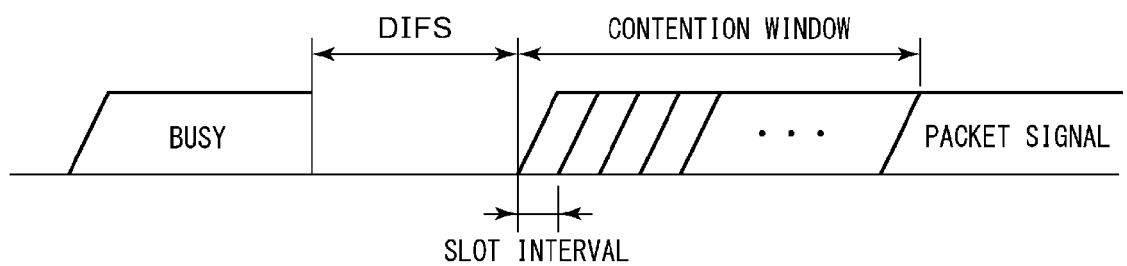
FIG. 9 shows an operation of the portable terminal apparatus of FIG. 8.

When the timing of the frame and subframes and the information regarding the inter-vehicular transmission period are received from the extraction unit 86, the setting unit 88 sets a random waiting time period for carrier sensing in the inter-vehicular transmission period in a manner similar to the in-vehicle terminal apparatus 14. A description is now given of an outline of carrier sensing CSMA operation. FIG. 9 shows an operation of the portable terminal apparatus 18. The horizontal axis indicates time. "Busy" indicates a state where signals from other apparatuses are being received. After a "busy" state, the CSMA operation waits for the duration of a distributed interframe space (DIFS), which is a distributed coordination function (DCF) interframe space. Further, after the DIFS, the CSMA operation waits for the duration of a random backoff interval. Here, the backoff interval is represented by a randomly selected contention window multiplied by a slot size (slot time). The random backoff interval corresponds to the aforementioned random waiting time period. If no signals is received during this waiting time period, the packet signals will be transmitted. Here, the contention window is comprised of a plurality of slots. The size of each slot is 13 μsec long. Also, the number of slots is set by a random number composed of 1 to N.

It is expected that the effect of the portable terminal apparatus 18 on the transmission of packet signals sent from the in-vehicle terminal apparatus 14 will be reduced. In order to cope with this, the range of random numbers settable for the carrier sensing unit 90 to carry out carrier sensing is set such that the range thereof is longer than the range of random numbers settable for the in-vehicle terminal apparatus 14 to carry out carrier sensing. For example, the range of random numbers settable for the portable terminal apparatus 18 to carry out carrier sensing is set by 0 to N, whereas the range of random numbers settable for the in-vehicle terminal apparatus 14 to carry out carrier sensing is set by 0 to N/2. Note that the range thereof for the former may be 0 to 2N and the range thereof for the latter may be 0 to N.

This corresponds to the following. That is, the range of random waiting time periods settable by the portable terminal apparatus 18 is longer than the range thereof settable by the in-vehicle terminal apparatus 14. Also, the maximum value of random waiting time periods settable by the setting unit 88 is larger than the maximum value of random waiting time periods settable for the in-vehicle terminal apparatus 14 to carry out carrier sensing. Refer back to FIG. 8. If it has been informed from the setting unit 88 that the frame is not specified, the setting unit 88 will similarly set the random backoff interval independently of the frame construction.

The carrier sensing unit 90 carries out carrier sensing over a random waiting time period and DIFS set by the setting unit 88. The modem unit 74 and the RF unit 72 broadcast packet signals based on the results of carrier sensing carried out by the carrier sensing unit 90. Here, the length of packet signal broadcast from the portable terminal apparatus 18 is shorter than the length of packet signal broadcast from the in-vehicle terminal apparatus 14.

By employing the exemplary embodiments of the present invention, the range of random backoff intervals for the portable terminal apparatus is larger than that for the in-vehicle terminal apparatus. Thus the amount of delay in the transmission timing of packet signals from the in-vehicle terminal apparatus is small and therefore the effect on the transmission of packet signals from the in-vehicle terminal apparatus can be reduced. Also, the maximum value of random backoff intervals for the portable terminal apparatus is larger than that for the in-vehicle terminal apparatus. Thus the effect of the transmission of packet signals from the portable terminal apparatus upon the transmission of packet signals from the in-vehicle terminal apparatus can be reduced. Even though the maximum value of random backoff intervals is raised, the timing with which the signal is to be actually transmitted is selected from among the random backoff intervals, so that the transmission opportunities can be ensured in the event that the transmission probability decreases.

Next, a description will be given of a modification of the exemplary embodiments. Similar to the exemplary embodiments, the modification relates to a portable terminal apparatus carried by a pedestrian. The portable terminal apparatus according to the modification transmits, by broadcast, packet signals by carrying out CSMA/CA in an inter-vehicular transmission period. In the exemplary embodiment, the range of random numbers settable for the carrier sensing in the portable terminal apparatus is set such that the range thereof is longer than the range of random numbers settable for the carrier sensing in the in-vehicle terminal apparatus. In the modification, on the other hand, the ranges of random numbers in both the portable terminal apparatus and the in-vehicle terminal apparatus are set equal for the purpose of leveling off the transmission opportunities of the both. The communication system 100, the base station apparatus 10, the in-vehicle terminal apparatus 14 and the portable terminal apparatus 18 according to the modification are of similar type to those of FIG. 1, FIG. 2, FIG. 7 and FIG. 8, respectively. A description is given here centering around features different from those thereof.

The range of random numbers settable for the carrier sensing unit 90 to carry out carrier sensing is set by the setting unit 88 such that the range thereof is equal to the range of random numbers settable for the in-vehicle terminal apparatus 14 to carry out carrier sensing. For example, the range of random numbers settable for the portable terminal apparatus 18 to carry out carrier sensing is set by 0 to N, whereas the range of random numbers settable for the in-vehicle terminal apparatus 14 to carry out carrier sensing is also set by 0 to N. This corresponds to the following. That is, the range of random waiting time periods settable by the portable terminal apparatus 18 is equal to the range thereof settable by the in-vehicle terminal apparatus 14. Also, the maximum value of random waiting time periods settable by the setting unit 88 is equal to the maximum value of random waiting time periods settable for the in-vehicle terminal apparatus 14 to carry out carrier sensing.

By employing this modification, the range of random backoff intervals for the in-vehicle terminal apparatus is equal to that for the portable terminal apparatus. Thus the amounts of delay in the transmission timing of packet signals from both the in-vehicle terminal apparatus and the portable terminal apparatus are equal to each other. Hence, services fair to both the portable terminal apparatus and the in-vehicle terminal apparatus are available. Also, the maximum value of random backoff intervals for the in-vehicle terminal apparatus is equal to that for the portable terminal apparatus. Thus the services fair to both the portable terminal apparatus and the in-vehicle terminal apparatus can be provided.

Next, a description will be given of another modification of the exemplary embodiments. Similar to the above, another modification of the exemplary embodiments relates to a portable terminal apparatus carried by a pedestrian. In the above-described exemplary embodiments and the modification, the in-vehicle terminal apparatus and the portable terminal apparatus broadcast packet signals in the inter-vehicular transmission period. In contrast, according to another modification, a frame is constructed of road-to-vehicle transmission periods, inter-vehicular transmission periods, and pedestrian-to-vehicle transmission periods. The in-vehicle terminal apparatus broadcasts a packet signal in an inter-vehicular transmission period, whereas the portable terminal apparatus broadcasts a packet signal in a pedestrian-to-vehicle transmission period. That is, the period during which the in-vehicle terminal apparatus is allowed to broadcast the packet signal and the period during which the portable terminal apparatus is allowed to broadcast the packet signal are subjected to time-division multiplexing. The communication system 100, the base station apparatus 10, the in-vehicle terminal apparatus 14 and the portable terminal apparatus 18 according to another modification are of similar type to those of FIG. 1, FIG. 2, FIG. 7 and FIG. 8, respectively. A description is given here centering around features different from those thereof.

Figure 10:
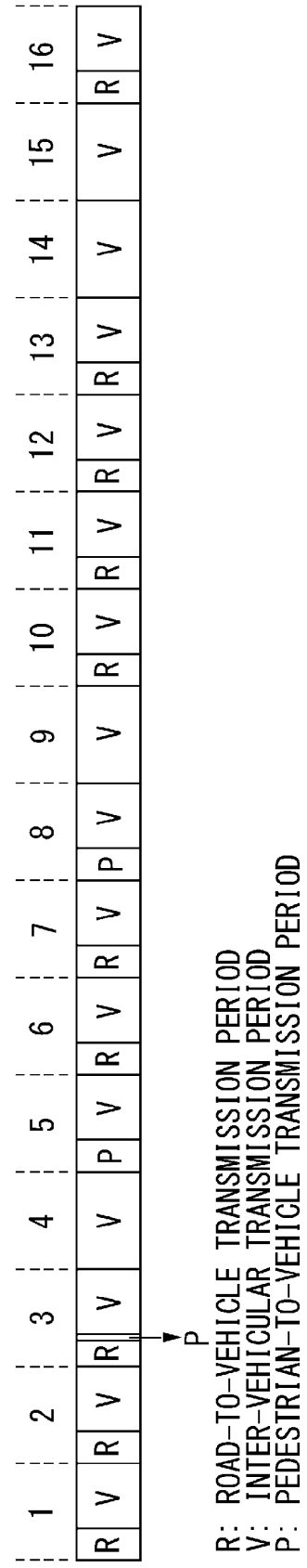
FIG. 10 shows a format of frame according to another modification of an exemplary embodiment.

FIG. 10 shows a format of frame according to another modification of the exemplary embodiments. The frame's format is shown in a similar manner to FIG. 4 and is constructed by time-division multiplexing the first to sixteenth subframes. In FIG. 10, "R" denotes a road-to-vehicle transmission period, "V" an inter-vehicular transmission period, and "P" a pedestrian-to-vehicle transmission period. In the subframes other than a subframe where a road-to-vehicle transmission period has been set for a base station apparatus 10, other different road-to-vehicle transmission periods for another different base station apparatus 10 are settable. For example, a road-to-vehicle transmission period for a base station apparatus 10 is set in the first subframe; other road-to-vehicle transmission periods for another base station apparatus 10 are set in the second subframe, the third subframe, the sixth subframe, the seventh subframe, the tenth to thirteenth subframes and the sixteenth subframe. In this case, a distinction is made, as a matter of convenience, between the road-to-vehicle transmission period and the other road-to-vehicle transmission periods. However, both of the road-to-vehicle transmission period and the other road-to-vehicle transmission periods are essentially road-to-vehicles periods and therefore sometimes they are not distinguished therebetween in the following description.

The pedestrian-to-vehicle transmission periods are settable in the remaining subframes where no road-to-vehicle transmission periods is set. In FIG. 10, the pedestrian-to-vehicle transmission periods are set in the fifth subframe and the eighth subframe among the fourth subframe, the fifth subframe, the eighth subframe, the ninth subframe, the fourteenth subframe and the fifteenth subframe. Also, the inter-vehicular transmission periods are set in other periods than the road-to-vehicle transmission periods and the pedestrian-to-vehicle transmission periods. Note that the pedestrian-to-vehicle transmission periods are also settable in the subframes where the road-to-vehicle transmission periods have been set. In the third subframe shown in FIG. 10, a pedestrian-to-vehicle transmission period is set between the road-to-vehicle transmission period and the inter-vehicular transmission period. In this manner, an operational administrative agency allocates M periods out of the total periods where the road-to-vehicle transmission periods are settable, as specified time periods for exclusive use of pedestrian-to-vehicle communication.

The base station apparatus 10 of FIG. 2 receives the registration of the specified time periods for exclusive use of pedestrian-to-vehicle communication determined beforehand by the operational administrative agency. The specified time period for exclusive use of pedestrian-to-vehicle communication corresponds to a time period where a pedestrian-to-vehicle transmission period is to be set. Here, the specified time period for exclusive use of pedestrian-to-vehicle communication is registered as the same value for other base station apparatuses 10. That is, a common pedestrian-to-vehicle transmission period is set for a plurality of base station apparatuses 10. The generator 36 has the information, on the road-to-vehicle transmission period used by said base station apparatus 10, contained in the IR control header and also has the information, on the pedestrian-to-vehicle transmission period, contained therein. Note that the information on the pedestrian-to-vehicle transmission period is contained commonly in the packet signals, transmitted from other base station apparatuses 10, too.

On the other hand, the information on the road-to-vehicle transmission period used by said base station apparatus 10 is not contained in the packet signals transmitted from other base station apparatuses 10. In this manner, the information on the pedestrian-to-vehicle transmission period is transmitted by broadcast from a plurality of base station apparatuses 10. When the pedestrian-to-vehicle transmission periods are broadcast, the subframe numbers and their lengths are specified the same way the road-to-vehicle transmission periods are specified. In other words, the pedestrian-to-vehicle transmission period is notified, as the road-to-vehicle transmission period, from the base station apparatus 10. However, the generator 36 appends information, by which to identify the road-to-vehicle transmission period and the pedestrian-to-vehicle transmission period, to the IR control header in order that the road-to-vehicle transmission period and the pedestrian-to-vehicle transmission period can be distinguished from each other.

FIGS. 11A to 11D each shows a format of packet signal according to another modification of an exemplary embodiment. These are items of information contained in the IR control header. FIG. 11A is 4-bit identification information. Here, the identity information is "0b1" in bit 3 when a packet signal is transmitted from the base station apparatus 10, and it is "0b0" in bit 3 when a packet signal is transmitted from the in-vehicle terminal apparatus 14 or the portable terminal apparatus 18. Also, the identity information is "0b0" in bit 2 when a packet signal is transmitted from the in-vehicle terminal apparatus 14, and it is "0b1" in bit 2 when a packet signal is transmitted from the portable terminal apparatus 18. FIGS. 11B to 11D show the setting of road-to-vehicle communication period information.

FIG. 12 shows a format of packet signal according to another modification of an exemplary embodiment. This format shows the extended areas, which are R1 to R16 (16 bits). The extended areas R1 to R16 indicate "road-to-vehicle transmission period 1" to "road-to-vehicle transmission 16", respectively. If the bit is "0b0", this means that the field is used as a road-to-vehicle transmission period; if the bit is "0b1", this means that the field is used as a pedestrian-to-vehicle transmission period. Such bits correspond to the aforementioned information by which to identify the road-to-vehicle transmission period and the pedestrian-to-vehicle transmission period.

Note that the pedestrian-to-vehicle transmission periods may be fixedly specified by an operations manager for a given system. In an area where no pedestrian-to-vehicle transmission periods is present, the portable terminal apparatus 18 may be allowed to transmit a packet signal in an inter-vehicular transmission period.

The extraction unit 52 in the in-vehicle terminal apparatus 14 of FIG. 7 recognizes, at an IR control layer level, whether the packet signal is a packet signal sent from a base station apparatus 10 or a packet signal sent from a portable terminal apparatus 18, and determines a synchronization destination for a control cycle of 100 microseconds (ms). Also, the extraction unit 52 updates a synchronization table variable if the packet signal is one sent from the portable terminal apparatus 18. As described earlier, the carrier sensing unit 54 sets NAV for the road-to-vehicle transmission period and the pedestrian-to-vehicle transmission period and then transmits, by broadcast, the packet signals by executing CSMA/CA in a period during which no NAV is set. The extraction unit 86 in the portable terminal apparatus 18 of FIG. 8 recognizes the pedestrian-to-vehicle transmission period conveyed by the base station apparatus 10. The carrier sensing unit 90 transmits, by broadcast, the packet signals using the identified pedestrian-to-vehicle transmission period.

By employing another modification, the inter-vehicular transmission periods and the pedestrian-to-vehicle transmission periods are specified separately from each other, so that the effect on the inter-vehicular communication can be reduced. Since the pedestrian-to-vehicle transmission periods are specified similarly to the road-to-vehicle transmission periods, the transmission of packet signals can be stopped in a pedestrian-to-vehicle transmission period even though the road-to-vehicle transmission periods only are recognizable by an in-vehicle terminal apparatus. Since the information by which to identify the road-to-vehicle transmission period and the pedestrian-to-vehicle transmission period is transmitted, a change from a system that informs only the road-to-vehicle transmission periods can be made small.

Next, a description will be given of still another modification of the exemplary embodiments. Similar to the above, still another modification of the exemplary embodiments relates to a portable terminal apparatus carried by a pedestrian. In still another modification, too, a frame is constructed of road-to-vehicle transmission periods, inter-vehicular transmission periods, and pedestrian-to-vehicle transmission periods. Still another modification differs from another modification in a method for setting the road-to-vehicle transmission periods. The communication system 100, the base station apparatus 10, the in-vehicle terminal apparatus 14 and the portable terminal apparatus 18 according to still another modification are of similar type to those of FIG. 1, FIG. 2, FIG. 7 and FIG. 8, respectively. A description is given here centering around features different from those thereof.

FIG. 13 shows a format of frame according to still another modification of the exemplary embodiments. The frame's format is shown in a similar manner to FIG. 10. In the subframes other than a subframe where a road-to-vehicle transmission period has been set for a base station apparatus 10, other different road-to-vehicle transmission periods for another different base station apparatus 10 are settable. For example, a road-to-vehicle transmission period for a base station apparatus 10 is set in the first subframe; other road-to-vehicle transmission periods for another base station apparatus 10 are set in the second subframe, the third subframe, the sixth subframe, the seventh subframe, the tenth to thirteenth subframes and the sixteenth subframe. The relation between the road-to-vehicle transmission period and the other road-to-vehicle transmission periods is similar to that described in another modification and they are sometimes not distinguished therebetween in the following description.

The pedestrian-to-vehicle transmission periods are set in the remaining subframes where no road-to-vehicle transmission periods is set. In FIG. 13, the pedestrian-to-vehicle transmission periods are set in the fourth subframe, the fifth subframe, the eighth subframe, the ninth subframe, the fourteenth subframe, and the fifteenth subframe. Also, the inter-vehicular transmission periods are set in other periods than the road-to-vehicle transmission periods and the pedestrian-to-vehicle transmission periods of a given frame. Note that the pedestrian-to-vehicle transmission periods are also settable in the subframes where the road-to-vehicle transmission periods have been set. That is, the periods, other than those actually used by the base station apparatus 10 as the road-to-vehicle transmission periods, out of periods where the road-to-vehicle transmission periods are settable are used as pedestrian-to-vehicle transmission periods.

Figures 14A, 14B:
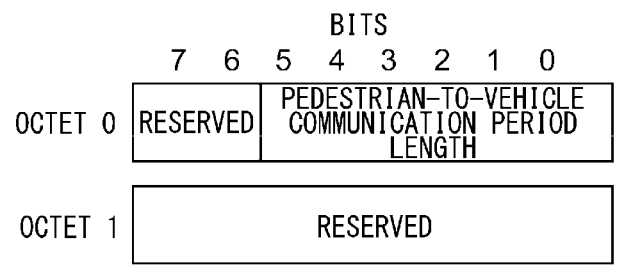
FIGS. 14A and 14B each shows a format of packet signal according to still another modification of an exemplary embodiment.

The base station apparatus 10 of FIG. 2 receives the registration of the specified time periods for exclusive use of pedestrian-to-vehicle communication determined beforehand by the operational administrative agency. Registered here is the prescription or definition where, with the maximum value of road-to-vehicle transmission period being 3.024 ms, the periods, where no road-to-vehicle transmission periods is actually set even though such road-to-vehicle transmission periods are settable, are used for the pedestrian-to-vehicle transmission periods. Also, the pedestrian-to-vehicle transmission periods themselves may be registered. Note here that if the length of pedestrian-to-vehicle transmission periods is to be fixed, the notification of such information on the pedestrian-to-vehicle communication length may be omitted. The generator 36 has the information, on the road-to-vehicle transmission period used by said base station apparatus 10, contained in the IR control header. FIGS. 14A and 14B each shows a format of packet signal according to still another modification of an exemplary embodiment. Theses formats show the extended areas, and the information on the pedestrian-to-vehicle communication length, namely the length of pedestrian-to-vehicle transmission periods, is notified using 6 bits composed of b5 to b0.

The extraction unit 52 in the in-vehicle terminal apparatus 14 of FIG. 7 recognizes the road-to-vehicle transmission period at an IR control layer level. Thus, as with the exemplary embodiment, the extraction unit 52 determines a synchronization destination for a control cycle of 100 ms. Also, the extraction unit 52 identifies, at an extended layer level, whether the packet signal is one sent from a base station apparatus 10 or one sent from a portable terminal apparatus 18. The carrier sensing unit 54 sets NAV for the pedestrian-to-vehicle transmission periods shown in FIGS. 14A and 14B and then transmits, by broadcast, the packet signals by executing CSMA/CA in a period during which no NAV is set. If the pedestrian-to-vehicle periods are fixed, the values that have been internally stored beforehand are used to identify the pedestrian-to-vehicle transmission periods. The extraction unit 86 in the portable terminal apparatus 18 of FIG. 8 identifies the periods, where no road-to-vehicle transmission periods is actually set, in the periods where the portable terminal apparatus 18 is usable. The carrier sensing unit 90 transmits, by broadcast, the packet signals using the identified periods.

By employing still another modification, the arrangement of pedestrian-to-vehicle transmission periods in the subframes, where no road-to-vehicle transmission periods are set, are specified beforehand. Thus the information amount of control information to be transmitted using the road-to-vehicle transmission periods can be reduced.

Next, a description will be given of still another modification of the exemplary embodiments. Still another modification relates to a management apparatus for registering the pedestrian-to-vehicle transmission periods for the above-described base station apparatus. The management apparatus corresponds to the aforementioned operational administrative agency. The communication system 100, the base station apparatus 10, the in-vehicle terminal apparatus 14 and the portable terminal apparatus 18 according to still another modification are of similar type to those of FIG. 1, FIG. 2, FIG. 7 and FIG. 8, respectively. A description is given here centering around features different from those thereof.

Figure 15:
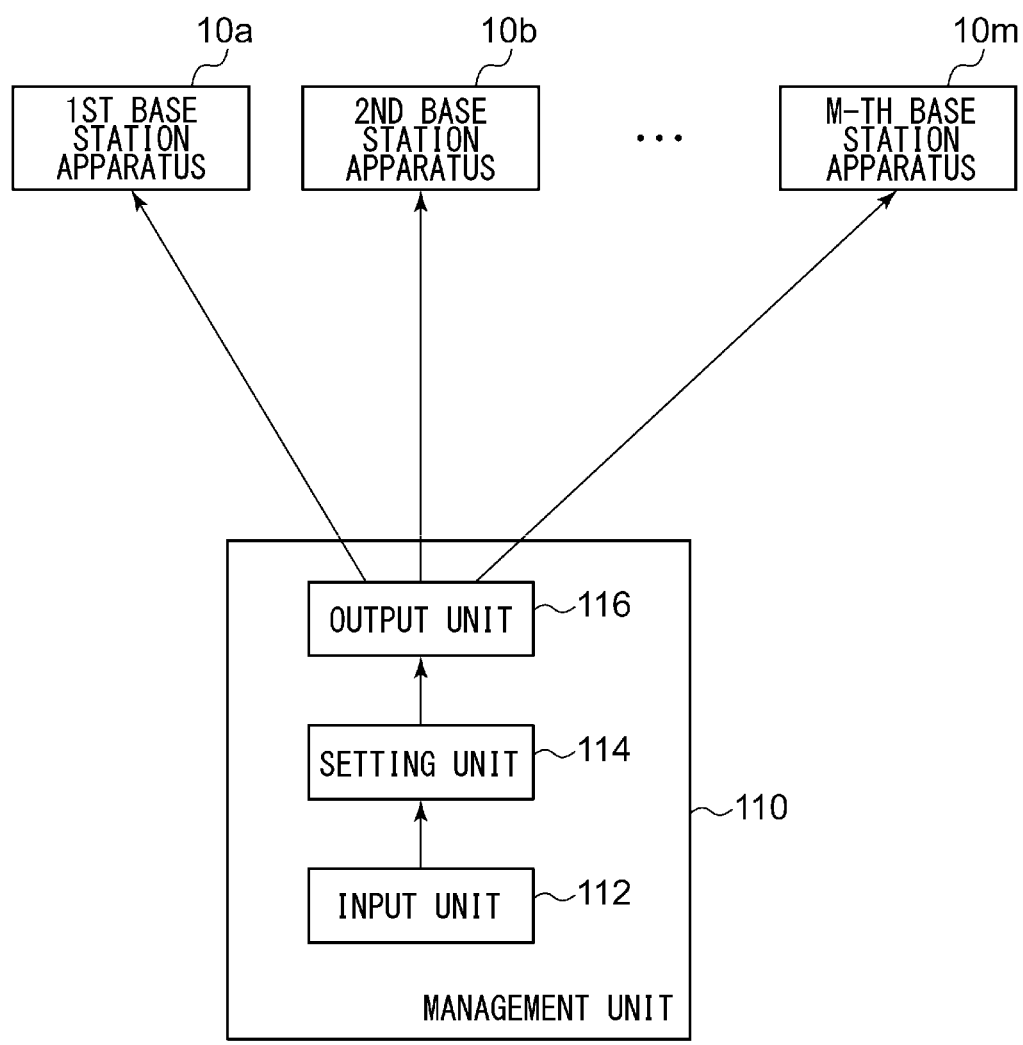
FIG. 15 shows a structure of a management apparatus according to still another modification of an exemplary embodiment.

FIG. 15 shows a structure of a management apparatus 110 according to still another modification of an exemplary embodiment. The management apparatus 110 includes an input unit 112, a setting unit 114, and an output unit 116. The input unit 112 receives, from an administrator, the information regarding pedestrian-to-vehicle transmission periods. The format of a frame is specified as shown in FIG. 10 and FIG. 13 and the description thereof is omitted here. The setting unit 114 sets the information regarding pedestrian-to-vehicle transmission periods, based on the values received by the input unit 112. The output unit 116 connects to a plurality of base station apparatuses 10 that are a first base station apparatus 10*a* to an M-th base station apparatus 10*m*, for instance, and outputs the information set by the input unit 112 to the plurality of base station apparatuses 10. As a result, commonly-used pedestrian-to-vehicle transmission periods are registered in the plurality of base station apparatuses 10.

By employing still another modification, the pedestrian-to-vehicle transmission periods are outputted to a plurality of base station apparatuses, so that the pedestrian-to-vehicle transmission periods common to the plurality of base station apparatuses can be set.

Next, a description will be given of still another modification of the exemplary embodiments. Still another modification relates to a communication system similar to the exemplary embodiments or the modifications. An in-vehicle terminal apparatus and a portable terminal apparatus according to still another modification each determines the transmission timing by carrying out CSMA/CA independently of the frame construction. This corresponds to the case where no base station apparatuses is located within the communication system, and this is similar to the processing in the almost-unreachable area 214. The in-vehicle terminal apparatus 14 and the portable terminal apparatus 18 according to still another modification are of similar type to those of FIG. 7 and FIG. 8, respectively. A description is given here centering around features different from those thereof.

Figure 16:
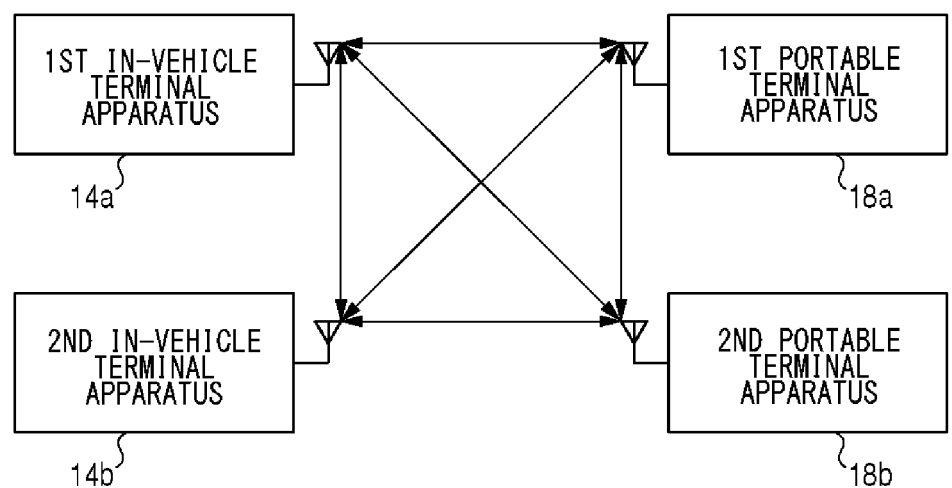
FIG. 16 shows a structure of a communication system according to still another modification of an exemplary embodiment.

FIG. 16 shows a structure of a communication system 100 according to still another modification of an exemplary embodiment. The communication system 100 includes a first in-vehicle terminal apparatus 14a, a second in-vehicle terminal apparatus 14b, a first portable terminal apparatus 18a, and a second portable terminal apparatus 18b. Although, for example, two in-vehicle terminal apparatuses 14 and two portable terminal apparatuses 18 are shown in FIG. 16, the number of in-vehicle terminal apparatuses 14 and the number of portable terminal apparatuses 18 are each not limited to "2" and may be more than 2. The in-vehicle terminal apparatuses 14 and the portable terminal apparatuses 18 broadcast packet signals.

The setting unit 88 sets a random waiting time period for carrier sensing. Similar to the exemplary embodiments, the range of waiting time periods settable by the setting unit 88 is longer than the range thereof settable by the in-vehicle terminal apparatus 14. Also, similar to the modification, the range of waiting time periods settable by the setting unit 88 may be equal to the range of waiting time periods settable for the in-vehicle terminal apparatus 14 to carry out carrier sensing. The range of random numbers set by the setting unit 88 is similar to that in the exemplary embodiments or the modification and therefore the description thereof is omitted here. What is different from the exemplary embodiments or the modification, however, is that the setting unit 88 sets the random waiting time periods independently of the in-vehicle transmission periods.

Figures 17A, 17B:
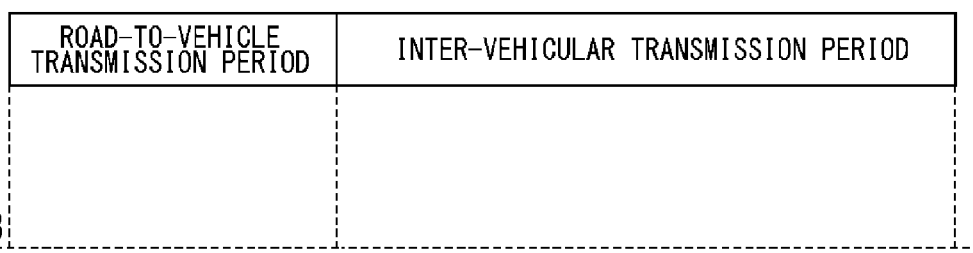
FIGS. 17A and 17B show operation timings in the communication system of FIG. 16.

FIGS. 17A and 17B show operation timings in the communication system 100. FIG. 17A shows a frame construction in the exemplary embodiments and the modification, and the frame contains a road-to-vehicle transmission period and an inter-vehicular transmission period similarly to those shown in FIG. 3A. FIG. 17B shows operation timings in still another modification. Different from FIG. 17A, the frame is not specified in FIG. 17B. Accordingly, the in-vehicle terminal apparatus 14 and the portable terminal apparatus 18 can set random waiting time periods at any given timings. Refer back to FIG. 8. The carrier sensing unit 90 performs carrier sensing over the waiting time period set by the setting unit 88, and the modem unit 74 and the RF unit 72 transmits packet signals based on the results of carrier sensing performed by the carrier sensing unit 90.

The random waiting time periods are set, by the in-vehicle terminal apparatus 14 of FIG. 7, too, similarly to the exemplary embodiments and the modification, and the packet signals are transmitted by carrying out CSMA/CA.

By employing still another modification, the same advantageous effects can be achieved even in an environment where no base station apparatuses is installed.

The present invention has been described based on the exemplary embodiments and modifications. The exemplary embodiments are intended to be illustrative only, and it is understood by those skilled in the art that various other modifications to constituting elements and processes as well as arbitrary combinations thereof could be further developed and that such modifications and combinations are also within the scope of the present invention.

In the exemplary embodiments of the present invention and still another modification of an exemplary embodiment, a random waiting time period settable by the portable terminal apparatus 18 and a random waiting time period settable for the in-vehicle terminal apparatus 14 to carry out carrier sensing overlap with each other. However, this should not be considered as limiting and, for example, the range of random waiting time periods settable by the setting unit 88 may differ or deviate from the range of random waiting time periods settable for the in-vehicle terminal apparatus 14 to carry out carrier sensing. For example, the contention window in the setting unit 88 may be specified as "48" to "63", and the contention window in the in-vehicle terminal apparatus 14 may be specified as "0" to "47". By employing this modification, the random waiting time periods are shifted from each other, so that the collision probability of packet signals can be reduced.

In the exemplary embodiments of the present invention and still another modification of an exemplary embodiment, both the random waiting time period settable by the portable terminal apparatus 18 and the random waiting time period settable for the in-vehicle terminal apparatus 14 to carry out carrier sensing are set variably. However, this should not be considered as limiting and, for example, the range of random waiting time periods settable by the setting unit 88 may be fixed, and the range of random waiting time periods settable for the in-vehicle terminal apparatus 14 to carry out carrier sensing may vary. By employing this modification, the processing carried out by the portable terminal apparatus 18 can be simplified.

In the modification of an exemplary embodiment and still another modification thereof, a random waiting time period settable by the portable terminal apparatus 18 and a random waiting time period settable for the in-vehicle terminal apparatus 14 to carry out carrier sensing overlap with each other. However, this should not be considered as limiting and, for example, the range of random waiting time periods settable by the setting unit 88 may differ or deviate from the range of random waiting time periods settable for the in-vehicle terminal apparatus 14 to carry out carrier sensing. For example, odd random numbers may be used for the contention window in the setting unit 88, and even random numbers may be used for the contention window in the in-vehicle terminal apparatus 14. By employing this modification, the random waiting time periods are different or shifted from each other, so that the collision probability of packet signals can be reduced.

In the exemplary embodiments of the present invention, the modification, another modification and still another modification of an exemplary embodiment, the in-vehicle terminal apparatus 14 and the portable terminal apparatus 18 are structured separately. However, this should not be considered as limiting and, for example, the in-vehicle terminal apparatus 14 and the portable terminal apparatus 18 may be integrally structured into a single apparatus. Such a single terminal apparatus terminal will be an in-vehicle terminal apparatus 14 when it is operated under an in-vehicle mode and will be a portable terminal apparatus 18 under a mobile mode. Such a single terminal apparatus may be thought of as an in-vehicle terminal apparatus 14 or a portable terminal apparatus 18 depending on the situation. By employing this modification, a single terminal unit having the both functions of in-vehicle terminal apparatus 14 and the portable terminal apparatus 18 can be achieved.

The features and characteristics of the exemplary embodiments of the present invention and their modification, another modification and still another modifications may also be defined by the following Item 1-1 to Item 5-2:

(Item 1-1) A terminal apparatus including:

a receiver for receiving a packet signal, containing information regarding a frame construction, which is transmitted from a base station apparatus in a first period of a frame at least including a first period and a second period;

an identifying unit for identifying the second period in the frame, based on the packet signal received by the receiver;

a setting unit for setting a waiting time period in the second period identified by the identifying unit;

a carrier sensing unit for performing carrier sensing over the waiting time period set by the setting unit; and a transmitter for transmitting a packet signal based on a result of the carrier sensing performed by the carrier sensing unit, wherein a range of the waiting time period settable by the setting unit is longer than a range of the waiting time period, for the carrier sensing, which is settable by another terminal apparatus of a different type capable of transmitting a packet signal in the second period.

For example, the "first period" in Item 1-1 corresponds to the "road-to-vehicle transmission period" in the exemplary embodiments and the modifications, and the "second period" corresponds to the "inter-vehicular transmission period". For example, the "other terminal apparatus of the different type" corresponds to the "in-vehicle terminal apparatus", and the "terminal apparatus" corresponds to the "portable terminal apparatus".

For example, even when the number of terminal apparatuses increases with the result that the traffic increases, the terminal apparatus sets the waiting time period such that an average waiting time period at the time a packet is transmitted is loner than that in the other terminal apparatus of the different type. Thus, an adverse effect on the service availability for the other terminal of the different type can be suppressed.

(Item 1-2) A terminal apparatus according to Item 1-1, wherein a maximum value of the waiting time period settable by the setting unit is larger than a maximum value of the waiting time period, for the carrier sensing, settable by the other terminal apparatus of the different type.

(Item 1-3) A terminal apparatus according to Item 1-1, wherein the range of the waiting time period settable by the setting unit differs from the range of the waiting time period, for the carrier sensing, settable by the other terminal apparatus of the different type.

For example, even when the number of terminal apparatuses increases with the result that the traffic increases, the other terminal apparatus of the different type and the terminal apparatus set their respective waiting time periods of mutually different transmission timings. Thus an increase in the collision probability of packet signals transmitted between the terminal apparatus and the other terminal apparatus of the different type can be suppressed.

(Item 1-4) A terminal apparatus according to Item 1-1, wherein the range of the waiting time period settable by the setting unit is indicated by fixed values, and the range of the waiting time period, for the carrier sensing, settable by the other terminal apparatus of the different type is indicated by variant values.

For example, even when the number of terminal apparatuses increases with the result that the traffic increases, the fixed value of a waiting time period for the terminal apparatus is set such that the fixed value thereof is longer than an average value of varying waiting time periods for the other terminal apparatus of the different type. Thus an increase in the collision probability of packet signals transmitted between the terminal apparatus and the other terminal apparatus of the different type can be suppressed.

(Item 2-1) A terminal apparatus including:

a receiver for receiving a packet signal, containing information regarding a frame construction, which is transmitted from a base station apparatus in a first period of a frame at least including a first period and a second period;

an identifying unit for identifying the second period in the frame, based on the packet signal received by the receiver;

a setting unit for setting a waiting time period in the second period identified by the identifying unit;

a carrier sensing unit for performing carrier sensing over the waiting time period set by the setting unit; and a transmitter for transmitting a packet signal based on a result of the carrier sensing performed by the carrier sensing unit, wherein a range of the waiting time period settable by the setting unit is equal to a range of the waiting time period, for the carrier sensing, which is settable by another terminal apparatus of a different type capable of transmitting a packet signal in the second period.

For example, the "first period" corresponds to the "road-to-vehicle transmission period", and the "second period" corresponds to the "inter-vehicular transmission period". For example, the "other terminal apparatus of the different type" corresponds to the "in-vehicle terminal apparatus", and the "terminal apparatus" corresponds to the "portable terminal apparatus".

For example, both the other terminal apparatus of the different type and the terminal apparatus set their waiting time periods whose ranges are equal to each other. Thus, evenly distributed transmission periods, namely fairly equal transmission opportunities, can be assigned regardless of the type of terminal apparatuses and the services.

(Item 2-2) A terminal apparatus according to Item 2-1, wherein a maximum value of the waiting time period settable by the setting unit is equal to a maximum value of the waiting time period, for the carrier sensing, settable by the other terminal apparatus of the different type.

For example, both the other terminal apparatus of the different type and the terminal apparatus set their waiting time periods whose maximum values are equal to each other. Thus, evenly distributed transmission periods, namely fairly equal transmission opportunities, can be assigned regardless of the type of terminal apparatuses and the services.

(Item 2-3) A terminal apparatus according to Item 2-1, wherein the range of the waiting time period settable by the setting unit differs from the range of the waiting time period, for the carrier sensing, settable by the other terminal apparatus of the different type.

For example, even when both the other terminal apparatus of the different type and the terminal apparatus set their respective waiting time periods in the same range, their ranges of waiting time periods differ from each other. Thus an increase in the collision probability of packet signals transmitted between the terminal apparatus and the other terminal apparatus of the different type can be suppressed.

(Item 3-1) A base station apparatus including:

a generator for a packet signal to be transmitted, in a first period set in at least one subframe of a frame, the frame being constructed by time-division multiplexing a plurality of subframes; and a transmitter for transmitting the packet signal generated by the generator in the first period, wherein another first period, in which another base station apparatus transmits a packet signal, is settable in a subframe other than the subframe to which the first period, in which the transmitter is to transmit the packet signal, is assigned, a second period, in which a terminal apparatus of first type transmits a packet signal, is settable in a subframe other than the subframe to which the first period and the other first period have been assigned, and a third period, in which a terminal apparatus of second type transmits a packet signal, is set in periods other than the first period, the other first period and the second period in the frame.

For example, the "first period" and the "other first period" both correspond to the "road-to-vehicle transmission period", the "second period" corresponds to the "pedestrian-to-vehicle transmission period", and the "third period" corresponds to the "inter-vehicular transmission period". For example, the "terminal apparatus of first type" corresponds to the "portable terminal apparatus", and the "terminal apparatus of second type" corresponds to "in-vehicle terminal apparatus".

For example, the terminal apparatus of first type, the terminal apparatus of second type and the base station apparatus set separate transmittable periods, respectively. Thus, even in an environment where their respective radio apparatuses are wirelessly available, an adverse effect on mutual transmission opportunities can be reduced.

(Item 3-2) A base station apparatus according to Item 3-1, wherein the second period is settable even in the subframe to which the first period, in which the transmitter is to transmit the packet signal, is assigned and even in the subframe to which the other first period, in which the other base station apparatus transmits the packet signal, is assigned.

For example, the second period is also set in the subframe to which the first period has already been assigned. Thus the lengths of the second periods in a frame can be made longer.

(Item 3-3) A base station apparatus according to Item 3-1 or Item 3-2, wherein the generator has information on the thus set first period and information on the thus set second period contained in the packet signal, and the information on the set second period is contained commonly in the packet signal, transmitted from the other base station apparatus, too.

For example, transmittable periods can be detected by the terminal apparatus of second type without identifying the first period and the second period. Thus the processing can be simplified.

(Item 3-4) A base station apparatus according to claim 3-3, wherein information by which to identify the first period and the second period is contained in the packet signal, too.

For example, the first period and the second period can be easily identified by the terminal apparatus of third type. Thus the processing can be performed faster.

(Item 4-1) A base station apparatus including:

a generator for a packet signal to be transmitted, in a first period set in at least one subframe of a frame, the frame being constructed by time-division multiplexing a plurality of subframes; and a transmitter for transmitting the packet signal generated by the generator in the first period, wherein another first period, in which another base station apparatus transmits a packet signal, is settable in a subframe other than the subframe to which the first period, in which the transmitter is to transmit the packet signal, is assigned, a second period, in which a terminal apparatus of first type transmits a packet signal, is set in a subframe other than the subframe to which the first period and the other first period have been assigned, and a third period, in which a terminal apparatus of second type transmits a packet signal, is set in periods other than the first period, the other first period and the second period in the frame.

For example, the "first period" corresponds to the "road-to-vehicle transmission period", the "second period" corresponds to the "pedestrian-to-vehicle transmission period", and the "third period" corresponds to the "inter-vehicular transmission period". For example, the "terminal apparatus of first type" corresponds to the "portable terminal apparatus", and the "terminal apparatus of second type" corresponds to "in-vehicle terminal apparatus".

For example, the terminal apparatus of first type, the terminal apparatus of second type and the base station apparatus set separate transmittable periods, respectively. Thus, even in an environment where their respective radio apparatuses are wirelessly available, an adverse effect on mutual transmission opportunities can be reduced.

(Item 4-2) A base station apparatus according to Item 4-1, wherein the second period is settable even in the subframe to which the first period, in which the transmitter is to transmit the packet signal, is assigned and even in the subframe to which the other first period, in which the other base station apparatus transmits the packet signal, is assigned.

For example, the second period is set based on the number of terminal apparatuses of first type, the number of terminal apparatuses of second type and the traffic intensity. Thus a service that suits the design of a business operation can be realized.

(Item 4-3) A base station apparatus according to Item 4-1 or Item 4-2, wherein the generator has information on the thus set first period contained in the packet signal.

For example, the transmittable time periods can be identified by the terminal apparatus of first type. Thus the processing can be simplified.

(Item 5-1) A management apparatus including:

a setting unit for setting information concerning a second period;

an output unit for outputting the information set by the setting unit to a plurality of base station apparatuses, respectively, wherein first periods, in which the respective plurality of base station apparatus transmit packet signals, is settable in mutually different subframes in a frame, the frame being constructed by time-division multiplexing a plurality of subframes, the second period, in which a terminal apparatus of first type transmits a packet signal, is settable in a subframe other than the subframes to which the first periods have been assigned, and a third period, in which a terminal apparatus of second type transmits a packet signal, is set in periods other than the first periods and the second period in the frame.

For example, the "first period" corresponds to the "road-to-vehicle transmission period", the "second period" corresponds to the "pedestrian-to-vehicle transmission period", and the "third period" corresponds to the "inter-vehicular transmission period". For example, the "terminal apparatus of first type" corresponds to the "portable terminal apparatus", and the "terminal apparatus of second type" corresponds to "in-vehicle terminal apparatus".

For example, the terminal apparatus of first type, the terminal apparatus of second type and the base station apparatus set separate transmittable periods, respectively. Thus, even in an environment where their respective radio apparatuses are wirelessly available, an adverse effect on mutual transmission opportunities can be reduced.

(Item 5-2) A management apparatus according to Item 5-1, wherein the second period is settable even in the subframes to which the first periods have been assigned.

For example, the second period is also set in the subframes to which the first periods have already been assigned. Thus the lengths of the second periods in a frame can be made longer.

What is claimed is:

1. A terminal apparatus mounted on a vehicle a comprising:
    a receiver configured to receive a packet signal, containing information regarding a frame construction, which is transmitted from a base station apparatus in a first period of a frame at least including a first period and a second period;
    an identifying unit configured to identify the second period in the frame, based on the packet signal received by the receiver;
    a setting unit configured to set a waiting time period in the second period identified by the identifying unit;
    a carrier sensing unit configured to perform carrier sensing over the waiting time period set by the setting unit; and
    a transmitter configured to transmit a packet signal based on a result of the carrier sensing performed by the carrier sensing unit,
    wherein a range of the waiting time period settable by the setting unit is longer than a range of a waiting time period, for carrier sensing, which is settable by a terminal apparatus carried by a pedestrian capable of transmitting a packet signal in the second period.

2. A terminal apparatus according to claim 1, wherein a maximum value of the waiting time period settable by the setting unit is larger than a maximum value of the waiting time period, for the carrier sensing, settable by the terminal apparatus carried by the pedestrian.

3. A terminal apparatus according to claim 1, wherein the range of the waiting time period settable by the setting unit differs from the range of the waiting time period, for the carrier sensing, settable by the terminal apparatus carried by the pedestrian.

4. A terminal apparatus according to claim 1, wherein the range of the waiting time period settable by the setting unit is indicated by fixed values, and the range of the waiting time period, for the carrier sensing, settable by the terminal apparatus carried by the pedestrian is indicated by variant values.

* * * * *